United States Patent
Tavakoli

(10) Patent No.: US 11,733,889 B2
(45) Date of Patent: Aug. 22, 2023

(54) GENERATING NAMES FOR CLOUD STORAGE CONTAINERS

(71) Applicant: Business Objects Software LTD, Dublin (IE)

(72) Inventor: Ehsan Tavakoli, Vancouver (CA)

(73) Assignee: BUSINESS OBJECTS SOFTWARE LTD, Dublin (IE)

(*) Notice: Subject to any disclaimer, the term of this patent is extended or adjusted under 35 U.S.C. 154(b) by 106 days.

(21) Appl. No.: 17/237,834

(22) Filed: Apr. 22, 2021

(65) Prior Publication Data

US 2022/0342571 A1 Oct. 27, 2022

(51) Int. Cl.
*G06F 3/00* (2006.01)
*G06F 3/06* (2006.01)

(52) U.S. Cl.
CPC .......... *G06F 3/0634* (2013.01); *G06F 3/0604* (2013.01); *G06F 3/0683* (2013.01)

(58) Field of Classification Search
None
See application file for complete search history.

(56) References Cited

U.S. PATENT DOCUMENTS

| 10,394,646 B1* | 8/2019 | Kaufman | G06F 11/1004 |
| 2015/0261971 A1* | 9/2015 | McFerrin | H04L 63/10 |
| | | | 707/781 |
| 2022/0311620 A1* | 9/2022 | Saha | H04L 9/3239 |

* cited by examiner

*Primary Examiner* — Midys Rojas
(74) *Attorney, Agent, or Firm* — Fountainhead Law Group P.C.

(57) ABSTRACT

Embodiments of the present disclosure include systems and methods for generating names for cloud storage containers. A unique identifier associated with a user of the client device is received from the client device. Next, a hash value is generated based on the unique identifier associated with the user of the client device. A character encoding scheme is then used to encode the hash value into a first encoded value. Instances of a first character in the encoded value is replaced with a defined second character to form a second encoded value. Finally, the second encoded value is sent to a cloud storage service for the cloud storage service to create a storage container using the second encoded value as a name of the storage container.

20 Claims, 12 Drawing Sheets

300

John_Doe_5

65f03e20f7c6cd59646510d7eb444cbcd037f7dd39ffde88b7bb306e1be0b285

FIG. 4

500 mxyd4ihxy3gvszdfcdl6wrcmxtidp565hh755cfxxmyg4g7awkcq====

FIG. 5

600 mxyd4ihxy38vszdfcdl6wrcmxtidp565hh755cfxxmy8487awkcq9999

FIG. 6

GENERATING NAMES FOR CLOUD STORAGE CONTAINERS

BACKGROUND

Cloud computing services typically provide computing resources using an on-demand delivery model. Under such a delivery model, computing resources are made available to users as they are needed. The types of computing resources may include virtual machines, servers, software applications, processing power, data storage, data management, etc. For data storage, cloud computing services need to manage the data from different users so that users can only access their own data and not the data of other users. In many of these cloud computing services, users of the service may create storage containers (also referred to as buckets) to store their data. A user is usually prompted to provide a name for a storage container so that it can be referenced later on when the user wants to access the storage container (e.g., add data to the storage container, modify data in the storage container, delete data from the storage container, etc.). Different cloud computing services can impose different naming rules for its storage containers. For example, some cloud computing services limit the length of the storage container name to a defined maximum number of characters. Some other cloud computing services do not allow certain characters (e.g., certain letters, numbers, punctuation marks, etc.) or substrings in the storage container names. Another aspect of storage container names in some cloud computing systems is that the names of the storage containers are publicly viewable. For instance, if a user uses the names of clients or customers when creating different storage containers to store data for different clients or customers, the storage container names would be publicly accessible. Therefore, some cloud computing services may provide features that protect potentially sensitive data, such as the storage container names, from being publicly viewable.

SUMMARY

In some embodiments, a non-transitory machine-readable medium stores a program executable by at least one processing unit of a device. The program receives, from a client device, a unique identifier associated with a user of the client device. The program further generates a hash value based on the unique identifier associated with the user of the client device. The program also uses a character encoding scheme to encode the hash value into a first encoded value. The program further replaces instances of a first character in the encoded value with a defined second character to form a second encoded value. The program also sends the second encoded value to a cloud storage service for the cloud storage service to create a storage container using the second encoded value as a name of the storage container.

In some embodiments, the hash value may be a first hash value. The program may further receive, from the client device, a request associated with the storage container and the unique identifier associated with the user of the client device; generate a second hash value based on the unique identifier associated with the user of the client device; use the character encoding scheme to encode the second hash value into a third encoded value; and replace instances of the first character in the third encoded value with the defined second character to form a fourth encoded value. The request associated with the storage container may be a request to add an object to the storage container.

In some embodiments, using the character encoding scheme to encode the hash value may include iteratively identifying a defined number of bits in the hash value and encoding the defined number of bits into a character based on the character encoding scheme. The character encoding scheme may be configured to encode values into characters belonging to a defined set of characters. The defined second character may not be in the defined set of characters. The character encoding scheme may be configured to encode hash values into single case characters. Replacing instances of the first character in the encoded value with the defined second character to form the second encoded value may include retrieving a replacement rule that specifies the first character and the second character.

In some embodiments, a method receives, from a client device, a unique identifier associated with a user of the client device. The method further generates a hash value based on the unique identifier associated with the user of the client device. The method also uses a character encoding scheme to encode the hash value into a first encoded value. The method further replaces instances of a first character in the encoded value with a defined second character to form a second encoded value. The method also sends the second encoded value to a cloud storage service for the cloud storage service to create a storage container using the second encoded value as a name of the storage container.

In some embodiments, the hash value may be a first hash value. The method may further receive, from the client device, a request associated with the storage container and the unique identifier associated with the user of the client device; generate a second hash value based on the unique identifier associated with the user of the client device; use the character encoding scheme to encode the second hash value into a third encoded value; and replace instances of the first character in the third encoded value with the defined second character to form a fourth encoded value. The request associated with the storage container may be a request to add an object to the storage container.

In some embodiments, using the character encoding scheme to encode the hash value may include iteratively identifying a defined number of bits in the hash value and encoding the defined number of bits into a character based on the character encoding scheme. The character encoding scheme may be configured to encode values into characters belonging to a defined set of characters. The defined second character may not be in the defined set of characters. The character encoding scheme may be configured to encode hash values into single case characters. Replacing instances of the first character in the encoded value with the defined second character to form the second encoded value may include retrieving a replacement rule that specifies the first character and the second character.

In some embodiments, a system includes a set of processing units and a non-transitory machine-readable medium that stores instructions. The instructions cause at least one processing unit to receive, from a client device, a unique identifier associated with a user of the client device. The instructions further cause the at least one processing unit to generate a hash value based on the unique identifier associated with the user of the client device. The instructions also cause the at least one processing unit to use a character encoding scheme to encode the hash value into a first encoded value. The instructions further cause the at least one processing unit to replace instances of a first character in the encoded value with a defined second character to form a second encoded value. The instructions also cause the at least one processing unit to send the second encoded value to a cloud storage service for the cloud storage service to create a storage container using the second encoded value as a name of the storage container.

In some embodiments, the hash value may be a first hash value. The instructions may further cause the at least one processing unit to receive, from the client device, a request associated with the storage container and the unique identifier associated with the user of the client device; generate a second hash value based on the unique identifier associated with the user of the client device; use the character encoding scheme to encode the second hash value into a third encoded value; and replace instances of the first character in the third encoded value with the defined second character to form a fourth encoded value. The request associated with the storage container may be a request to add an object to the storage container.

In some embodiments, using the character encoding scheme to encode the hash value may include iteratively identifying a defined number of bits in the hash value and encoding the defined number of bits into a character based on the character encoding scheme. The character encoding scheme may be configured to encode values into characters belonging to a defined set of characters. The defined second character may not be in the defined set of characters. The character encoding scheme may be configured to encode hash values into single case characters.

The following detailed description and accompanying drawings provide a better understanding of the nature and advantages of various embodiments of the present disclosure.

BRIEF DESCRIPTION OF THE DRAWINGS

FIG. 3 illustrates an example user identifier (ID) according to some embodiments.

FIG. 4 illustrates an example hash value of the user ID illustrated in FIG. 3 according to some embodiments.

FIG. 5 illustrates an example encoded value of the hash value illustrated in FIG. 4 according to some embodiments.

FIG. 6 illustrates an encoded value after replacement rules are applied to the encoded value illustrated in FIG. 5 according to some embodiments.

DETAILED DESCRIPTION

Figure 1:
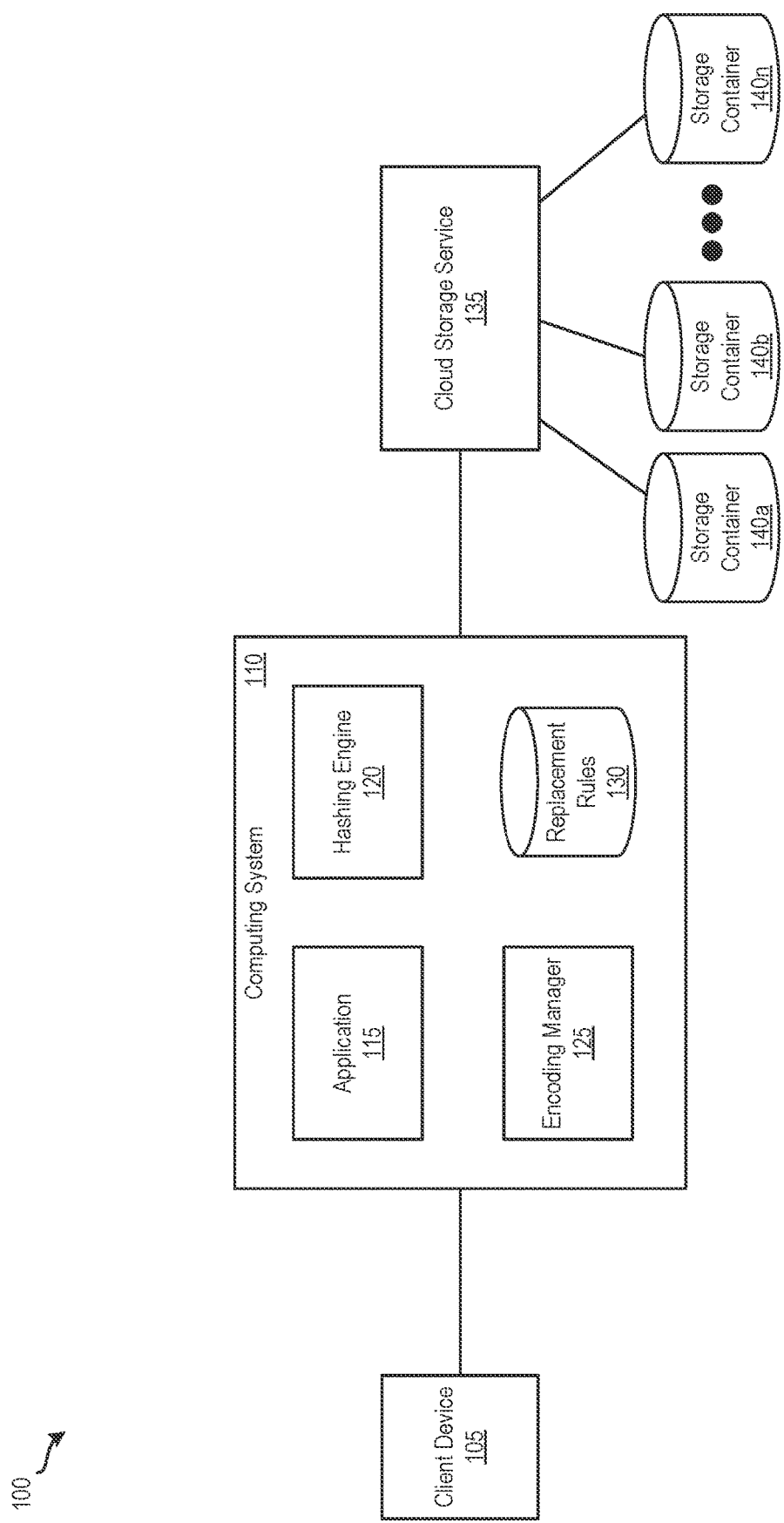
FIG. 1 illustrates a system according to some embodiments.

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for generating names for cloud storage containers. In some embodiments, a computing system is communicatively coupled to a cloud storage service. The computing system uses the cloud storage service to manage data for users of the computing system. For example, the computing system may receive, from a user of the client device, a unique identifier (ID) associated with the user as well as a request associated with the user's data (e.g., a request to access data, a request to modify data, a request to delete data). In response to the request, the computing system generates a hash value based on the unique ID associated with the user. Next, the computing system uses a character encoding scheme to encode the hash value into an encoded value. In some embodiments, the computing system can replace certain characters in the encoded value with defined characters so that the encoded value conforms to the naming requirements for storage containers managed by the cloud computing service. The modified encoded value is a unique name of a global storage container associated with the user. As such, the computing system references this generated name when sending requests associated with the user's data to the cloud computing service.

The techniques described in the present application provide a number of benefits and advantages over conventional methods for managing names for cloud storage containers. First, using a hashing and encoding algorithm on a unique identifier associated with a user allows the name of a cloud storage container associated with the user to be determined faster. Conventional methods may use a database that stores the association between the unique identifier associated with the user and a specified name of the cloud storage container. Executing a hashing and encoding algorithm is typically faster than querying a database storing the aforementioned mapping information. Second, using a hashing and encoding algorithm on a unique identifier associated with a user reduces the amount of bandwidth utilized. As mentioned, conventional techniques can store mapping information in a database. Not having to access a database saves valuable network and/or I/O bandwidth resources. Third, using a hashing and encoding algorithm on a unique identifier associated with a user is a more secure technique compared to conventional techniques. Conventional methods can access a table that maps unique IDs to names in order to look up names. This is a riskier approach because the data in the table can be corrupted, lost/deleted, or compromised.

FIG. 1 illustrates system 100 according to some embodiments. As shown, system 100 includes client device 105, computing system 110, cloud storage service 135, and storage containers 140a-n. Client device 105 is configured to communicate and interact with computing system 110. For example, a user of client device 105 may send application 115 requests to manage data for the user. Examples of types of request can include a request to add data to be managed by application 115 for the user, a request to retrieve data that application 115 is managing for the user, a request to modify data that application 115 is managing for the user, a request to delete data that application 115 is managing for the user, etc.

Computing system 110 is configured to generate names for cloud storage containers (e.g., storage containers 140a-n) managed by cloud storage service 135. As illustrated computing system includes application 115, hashing engine 120, encoding manager 125, and replacement rules storage 130. Replacement rules storage 130 stores replacement rules. In some embodiments, a replacement rule for strings specifies two character strings. The second character string defines the string that is used to replace instances of the first character string in a given input string. In some embodiments, replacement rules storage 130 is implemented in a single physical storage while, in other embodiments, replacement rules storage 130 may be implemented across several physical storages. While FIG. 1 shows replacement rules storage 130 as part of computing system 110, one of ordinary skill in the art will appreciate that replacement rules storage 130 may be external to computing system 110 in some embodiments.

Application 115 is a software application operating on computing system 110 that is responsible for providing data management services to client device 105. For instance, application 115 may receive from client device 105 a request to manage data for a user of client device 105. In response, application 115 determines a unique ID associated with the user and sends it to hashing engine 120. In some cases where the request received from the user is a request to add data to be managed for the user, a request to modify data managed by application 115 for the user, or a request to delete data managed by application 115 for the user, application 115 may send client device 105 a message indicating that the requested operation has been successfully performed. In some other cases where the request received from the user is a request to retrieve data associated with the user, application 115 can receive the requested data from cloud storage service 135. In such cases, application 115 forwards the data to client device 105.

Hashing engine 120 is configured to generate hash values. For example, hashing engine 120 can receive a value (e.g., a unique ID associated with a user) from application 115. In response to receiving the value, hashing engine 120 generates a hash value based on the received value. In some embodiments, hashing engine 120 generates a hash value for a value by using the value as an input to a hash function. Examples of hash functions that hashing engine 120 uses can include a secure hash algorithm 1 (SHA-1), a secure hash algorithm 2 (SHA-2) (e.g., SHA-224, SHA-256, SHA-384, SHA-512, etc.), an MD5 message-digest algorithm, etc. Once hashing engine 120 generates a hash value for a received value, hashing engine 120 sends the hash value to encoding manager 125 for further processing.

Encoding manager 125 handles the encoding of values. For instance, encoding manager 125 may receive a value (e.g., a hash value) from hashing engine 120. When encoding manager 125 receives the value, encoding manager 125 encodes the value using an encoding scheme. In some embodiments, encoding manager 125 encodes the value using a character encoding scheme. Examples of character encoding schemes include a base-16 (e.g., hex) encoding scheme, a base-32 encoding scheme, a base-64 encoding scheme, etc. Using a character encoding scheme, encoding manager 125 can encode a value by iteratively identifying a defined number of bits in the value and encoding the defined number of bits into a character based on a character encoding scheme. For example, in some cases where encoding manager 125 is using a base-32 encoding scheme, encoding manager 125 may iteratively identify five bits in a value and encode the five bits into a character in a set of 32 characters that corresponds to the five bit value.

Cloud storage service 135 is configured to provide cloud storage services for computing system 110. For example, cloud storage service 135 may receive from computing system 110 a request to create a storage container and a name for the storage container. In response to the request, cloud storage service 135 creates a storage container with the name Cloud storage service 135 can receive from computing system 110 a request to add data (e.g., objects) to a storage container 140 and the name of the storage container 140. In response, cloud storage service 135 stores the data in the storage container 140 that has the name. As another example, cloud storage service 135 may receive from computing system 110 a request to modify data (e.g., an object) in a storage container 140 and the name of the storage container 140. In response to the request, cloud storage service 135 modifies the data in the storage container 140 that has the name. Similarly, when cloud storage service 135 receives from computing system 110 a request to delete data (e.g., an object) from a storage container 140 and the name of the storage container 140, cloud storage service 135 deletes the data from the storage container 140 that has the name In some instances, cloud storage service 135 sends computing system 110 a message indicating whether a particular operation (e.g., creating a storage container 140, adding data to a storage container 140, modifying data in a storage container 140, deleting data from a storage container 140, etc.) was stored successfully.

In some embodiments, each of the storage containers 140a-n is a data structure configured to store data. Storage containers 140a-n may be referred to as buckets or storage buckets. Unlike folders or directories in computer file systems, storage containers 140a-n cannot be nested within another, in some embodiments. Each of the storage containers 140a-n has a globally unique name associated with it that is used to reference the storage container 140. That is, the name of each storage container 140 is globally unique relative to the names of other storage containers 140. In some embodiments, the name of a storage container 140 is publicly viewable.

Figure 2A:
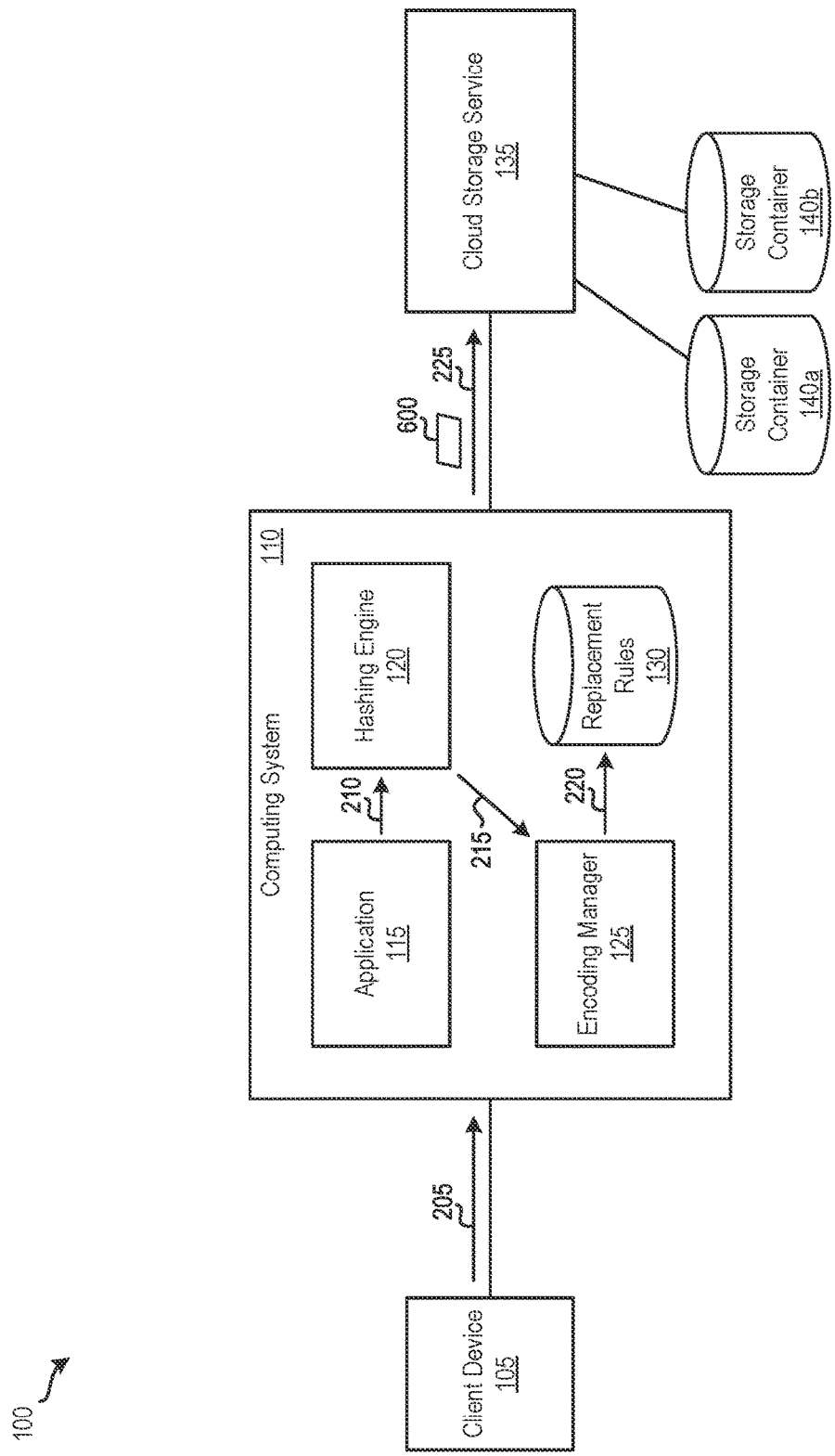
FIGS. 2A and 2B illustrate an example operation of the system illustrated in FIG. 1 according to some embodiments.
Figure 2B:
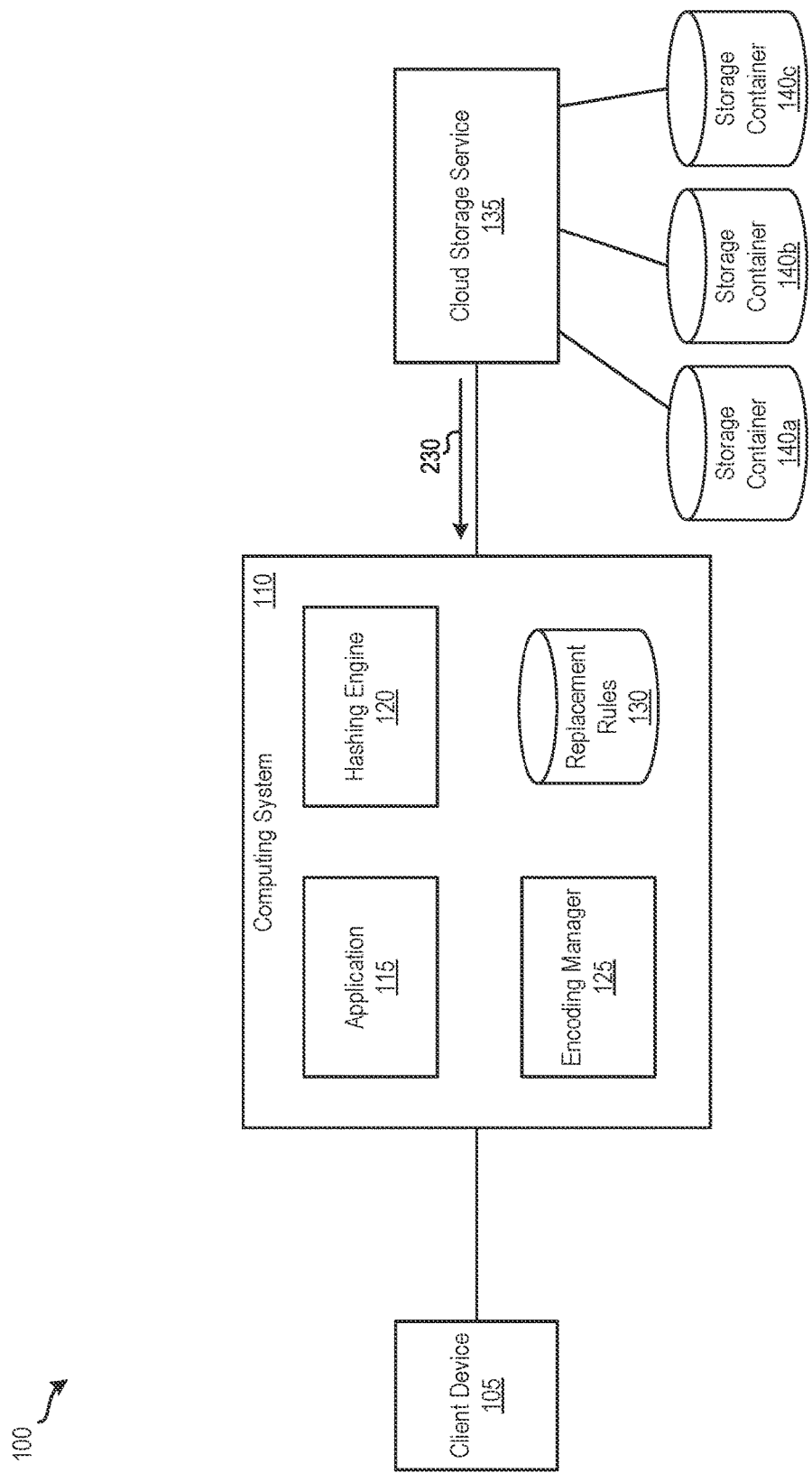

FIGS. 2A and 2B illustrate an example operation of system 100 according to some embodiments. Specifically, this example operation demonstrates how a storage container is created in some embodiments. For this example, a user of client device 105 is accessing (e.g., logging in to) application 115 for the first time. As depicted in FIG. 2A, the example operation starts by the user of client device 105 sending, at 205, application 115 a request to access application 115 along with a user ID associated with the user (e.g., a username, an email address, etc.) and password for logging into application 115. Upon the user successfully logging into application 115, application 115 sends, at 210, the user ID to hashing engine 120. FIG. 3 illustrates an example user ID 300 according to some embodiments. In particular, user ID 300 is the user ID used in this example. As shown, user ID 300 is "John_Doe_5".

Returning to FIG. 2A, once hashing engine 120 receives user ID 300, hashing engine 120 generates a hash value based on user ID 300. For this example, hashing engine 120 uses user ID 300 as an input to an SHA-256 hash function. The output of the SHA-256 hash function is a 256-bit value. FIG. 4 illustrates an example hash value 400 of user ID 300 according to some embodiments. Specifically, hash value 400 is the hash value generated by the SHA-256 hash function when user ID 300 is used as the input to the SHA-256 hash function. Hash value 400 is represented as a string of 64 hex values. As each hex value is four bits long, the total size of hash value 400 is 256 bits. Returning to FIG. 2A, hashing engine 120 sends, at 215, hash value 400 to encoding manager 125.

When encoding manager 125 receives hash value 400 from hashing engine 120, encoding manager 125 encodes hash value 400 using an encoding scheme. FIG. 5 illustrates an example encoded value 500 of hash value 400 according to some embodiments. The encoding scheme that encoding manager 125 is configured to use can be a character encoding scheme that encodes to single case characters (e.g., lowercase characters or uppercase characters). In this example, encoding manager 125 encodes hash value 400 using a based-32 character encoding scheme that includes the 26 lowercase characters of the English alphabet and numbers 2-7 in the character set. In particular, the 5-bit value of 00000 is encoded as the character "a", the 5-bit value 00001 is encoded as the character "b", the 5-bit value 00010 is encoded as the character "c", the 5-bit value 00011 is encoded as the character "d", the 5-bit value 00100 is encoded as the character "e", etc. In some embodiments, encoding manager 125 encodes hash value 400 by iteratively identifying a five bits in hash value 400 and encoding the five bits into a corresponding character in the character set of the base-32 character encoding scheme. After encoding hash value 400, encoding manager 125 adds a padding value ("=" in this example) to the end until the total number of characters in the encoded value is a factor of eight. Here, the encoding of hash value 400 results in 52 characters so encoding manager 125 pads it with four "=" characters.

Returning to FIG. 2A, encoding manager 125 then applies replacement rules to encoded value 500. As mentioned above, in some embodiments, a replacement rule for strings specifies two character strings where the second character string defines the string that is used to replace instances of the first character string in a given input string. In some embodiments, the second characters specified in a replacement rule are characters that are not in the character set of the encoding scheme used to encode the hash value. For this example, two such replacement rules will be applied to encoded value 500. The first replacement rule specifies to replace instances of the character "g" with the number "8". The second replacement rule specifies to replace instances of character "=" with the number "9". The characters specified in the two rules to replace "g" and "=" are not in the character set of the base-32 character encoding scheme described above. To apply these replacement rules to encoded value 500, encoding manager 125 retrieves, at 220, the two rules from replacement rules storage 130. FIG. 6 illustrates an encoded value 600 after replacement rules are applied to encoded value 500 according to some embodiments. As depicted in FIG. 6, encoded value 600 is the same value as encoded value 500 except with instances of the character "g" replaced with the character "8" and instances of the character "=" replaced with the character "9". The two replacement rules used in this example is one example of replacement rules that may be applied to an encoded value. One of ordinary skill in the art will appreciate that any number of additional and/or different replacement rules can be used in different embodiments. For example, while the example replacement rules described above specify to replace a single character with another single character, a replacement rule may specify a single character to replace several characters (e.g., replace instances of "the" with "0"), several characters to replace a single character (e.g., replace instances of "a" with "the"), several characters to replace another several characters (e.g., replace instances of "too" with "to"), etc.

Returning to FIG. 2A, encoding manager 125 sends, at 225, cloud storage service 135 encoded value 600 and a request to create a storage container with encoded value 600 as its name. In response to the request, cloud storage service 135 creates a storage container that has encoded value 600 as its name. FIG. 2B illustrates system 100 after cloud storage service 135 created the storage container. As illustrated, storage container 140c has been created and being managed by cloud storage service 135. After creating storage container 140c, cloud storage service 135 sends, at 230, computing system 110 a message indicating that a storage container with encoded value 600 as its name has been successfully created.

Figure 7A:
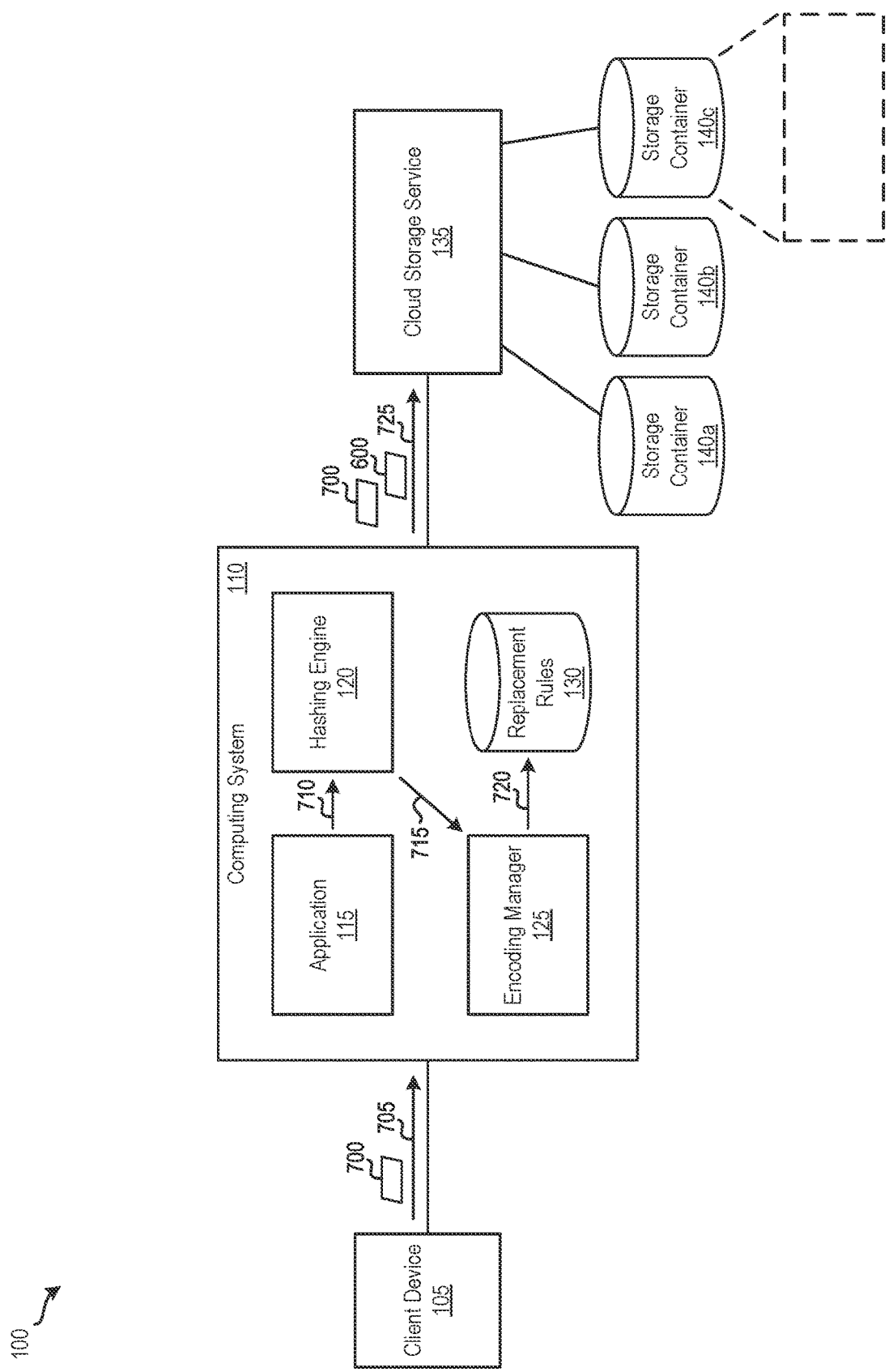
FIGS. 7A and 7B illustrate another example operation of the system illustrated in FIG. 1 according to some embodiments.
Figure 7B:
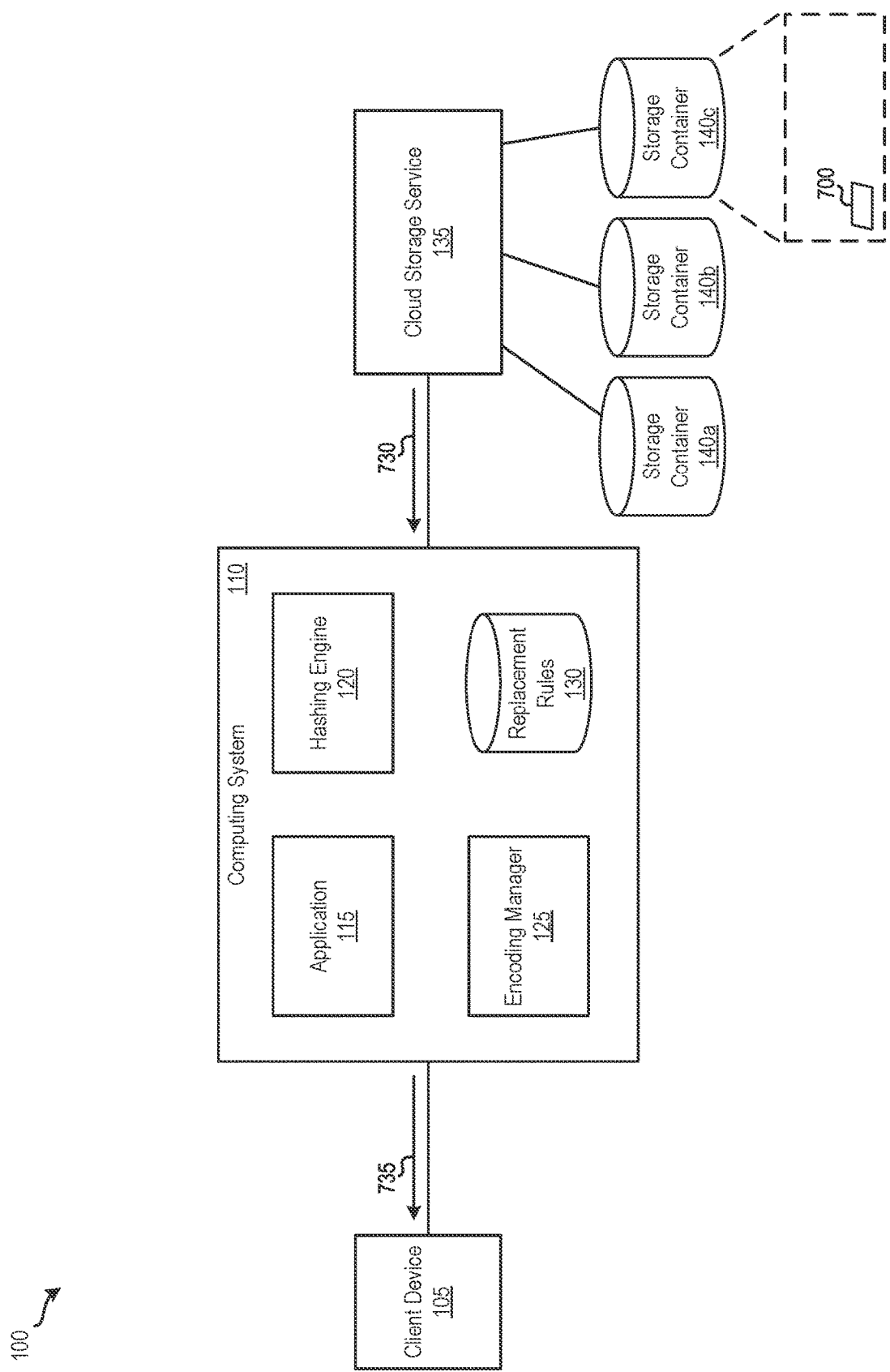

FIGS. 7A and 7B illustrate another example operation of system 100 according to some embodiments. Specifically, this example operation shows how data is added to a storage container in some embodiments. In this example, the same user of client device 105 in the example operation described above by reference to FIGS. 2-6 has logged into application 115. As shown in FIG. 7A, the example operation begins by the user of client device 105 sending, at 705, application 115 data object 700 and a request to add data object 700 to the data that application 115 is managing for the user. In response to the request, application 115 sends, at 710, the user ID associated with the user (i.e., user ID 300) to hashing engine 120.

When hashing engine 120 receives the user ID, hashing engine 120 generates a hash value based on the user ID. For this example, hashing engine 120 uses the user ID and an SHA-256 hash function to generate a hash value (i.e., hash value 400) in the same manner as the example operation described above by reference to FIGS. 2-6. Then, hashing engine 120 sends, at 715, the hash value to encoding manager 125. Upon receiving the hash value, encoding manager 125 uses the same base-32 character encoding scheme that was used in the operation described above by reference to FIGS. 2-6 to encode the hash value into an encoded value (i.e., encoded value 500). Encoding manager 125 then retrieves, at 720, the same two replacement rules from replacement rules storage 130 and applies them to the encoded value to form another encoded value (i.e., encoded value 600). Next, encoding manager 125 sends, at 725, cloud storage service 135 the encoded value, data object 700, and a request to add data object 700 to the storage container that has the encoded value as its name (i.e., storage container 140c). In response to the request, cloud storage service 135 adds data object 700 to storage container 140c. FIG. 7B illustrates system 100 after cloud storage service 135 adds data object 700 to storage container 140c. As depicted in FIG. 7B, data object 700 is now stored in storage container 140c. Once cloud storage service 135 adds data object 700 to storage container 140c, cloud storage service 135 sends, at 730, computing system 110 a message indicating that data object 700 has been successfully added to storage container 140c. In turn, computing system 110 sends, at 735, client device 105 a message indicating that data object 700 has been successfully stored.

Figure 8A:
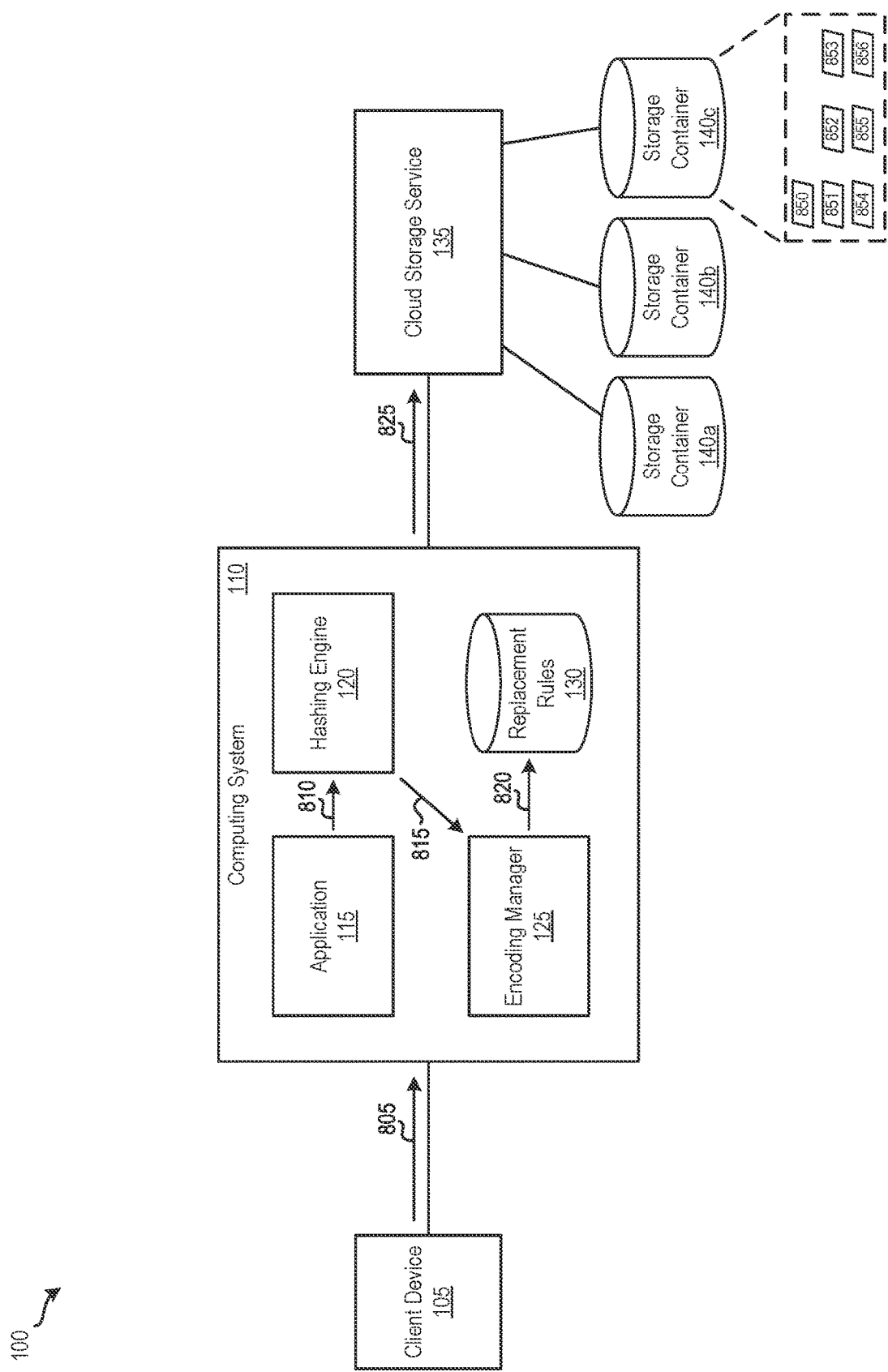
FIGS. 8A and 8B illustrate another example operation of the system illustrated in FIG. 1 according to some embodiments.
Figure 8B:
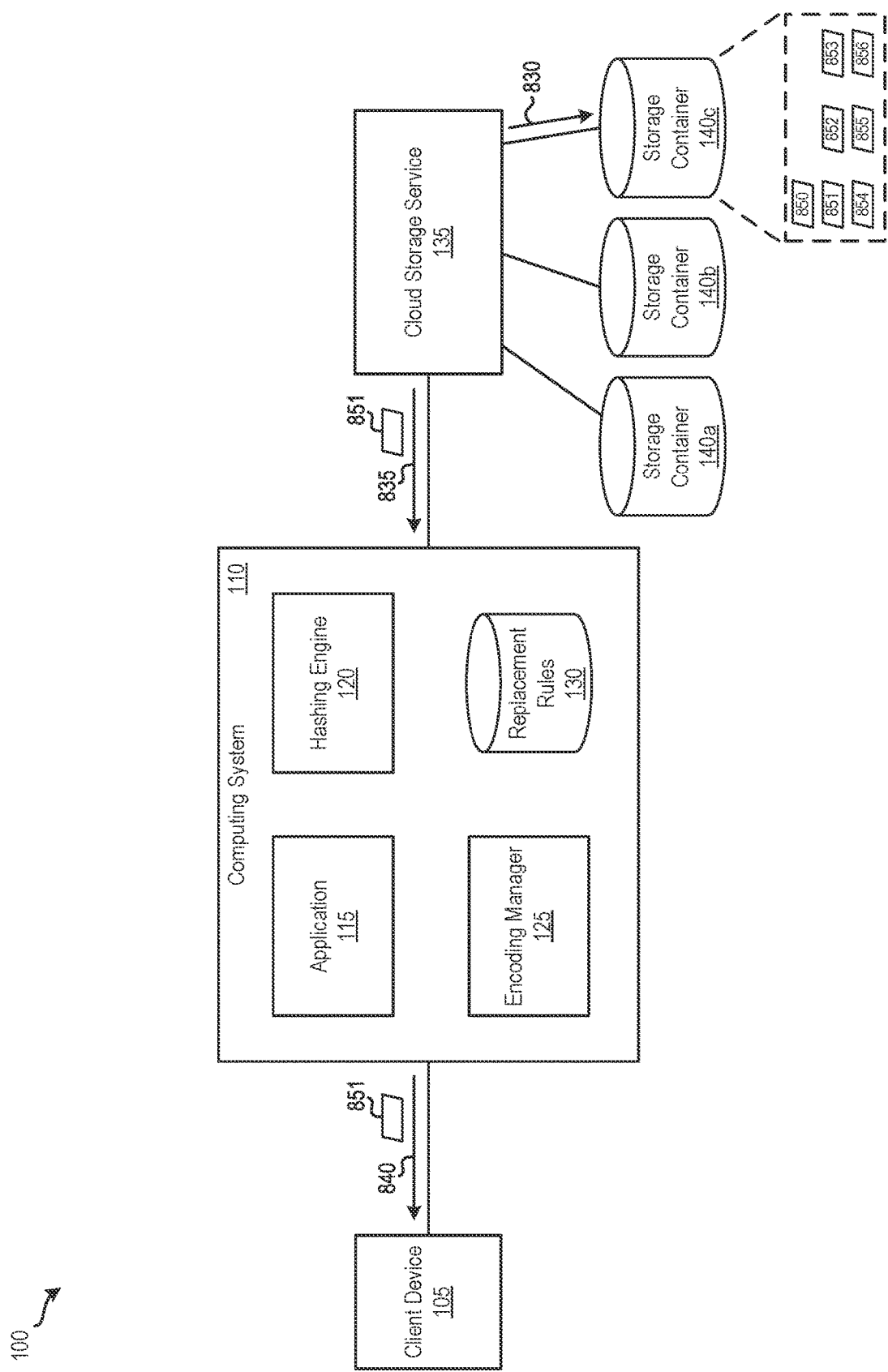

FIGS. 8A and 8B illustrate another example operation of system 100 according to some embodiments. In particular, this example operation illustrates how client device 105 accesses data managed by computing system 110 in some embodiments. For this example, the same user of client device 105 in the example operation described above by reference to FIGS. 2-7 has added several data objects 850-856 have been added to the data that application 115 is managing for the user, which is being stored in storage container 140c. In addition, the user had data object 700 removed from the data that application 115 is managing for the user. In this example, the user of client device 105 has logged into application 115. As illustrated in FIG. 8A, the example operation starts with the user of client device 105 sending, at 805, application 115 a request to access data object 851. In response to the request, application 115 sends, at 810, the user ID associated with the user (i.e., user ID 300) to hashing engine 120.

Upon receiving the user ID, hashing engine 120 generates a hash value based on the user ID. In this example, hashing engine 120 uses the user ID and an SHA-256 hash function to generate a hash value (i.e., hash value 400) in the same manner as the example operation described above by reference to FIGS. 2-7. Next, hashing engine 120 sends, at 815, the hash value to encoding manager 125. When encoding manager 125 receives the hash value, encoding manager 125 uses the same base-32 character encoding scheme that was used in the operation described above by reference to FIGS. 2-7 to encode the hash value into an encoded value (i.e., encoded value 500). Then, encoding manager 125 retrieves, at 820, the same two replacement rules from replacement rules storage 130 and applies them to the encoded value to form another encoded value (i.e., encoded value 600). At 825, encoding manager 125 sends cloud storage service 135 the encoded value and a request to retrieve data object 851 from the storage container that has the encoded value as its name (i.e., storage container 140c). FIG. 8B shows cloud storage service 135 responding to the request by retrieving, at 830, data object 851 from storage container 140c. Then, cloud storage service 135 sends, at 835, data object 851 to computing system 110. Computing system 110 forwards, at 840, data object 851 to client device 105.

The three example operations of system 100 described above by reference to FIGS. 2-8 illustrate how names for cloud storage containers are generated. Furthermore, these example operations show how a unique ID associated with a user can be utilized to generate a name for a storage container associated with the user. As mentioned above, the name of a storage container 140 is publicly viewable in some embodiments. Therefore, determining names for storage containers in this manner prevents sensitive information that may be part of the unique ID associated with the user from being exposed to the public. Also, the example operations demonstrate how computing system 110 can reliably determine the name of the storage container from the unique ID any time computing system 110 needs to reference the storage container when communicating with cloud storage service 135. While the example operations show one client device interacting with computing system 110, additional client devices may access computing system 110 (e.g., application 115). Computing system 110 generates names for storage containers associated with users of other client devices in a similar manner as that shown in the three examples. Moreover, the examples explained above utilize replacement rules that are stored in a storage. In some embodiments, the logic in the replacement rules are hardcoded as part of the logic of computing system 110 (e.g., hardcoded in encoding manager 125). In some such embodiments, the amount of I/O operations is reduced since computing system 110 does not need to access a storage to execute replacement rules.

Figure 9:
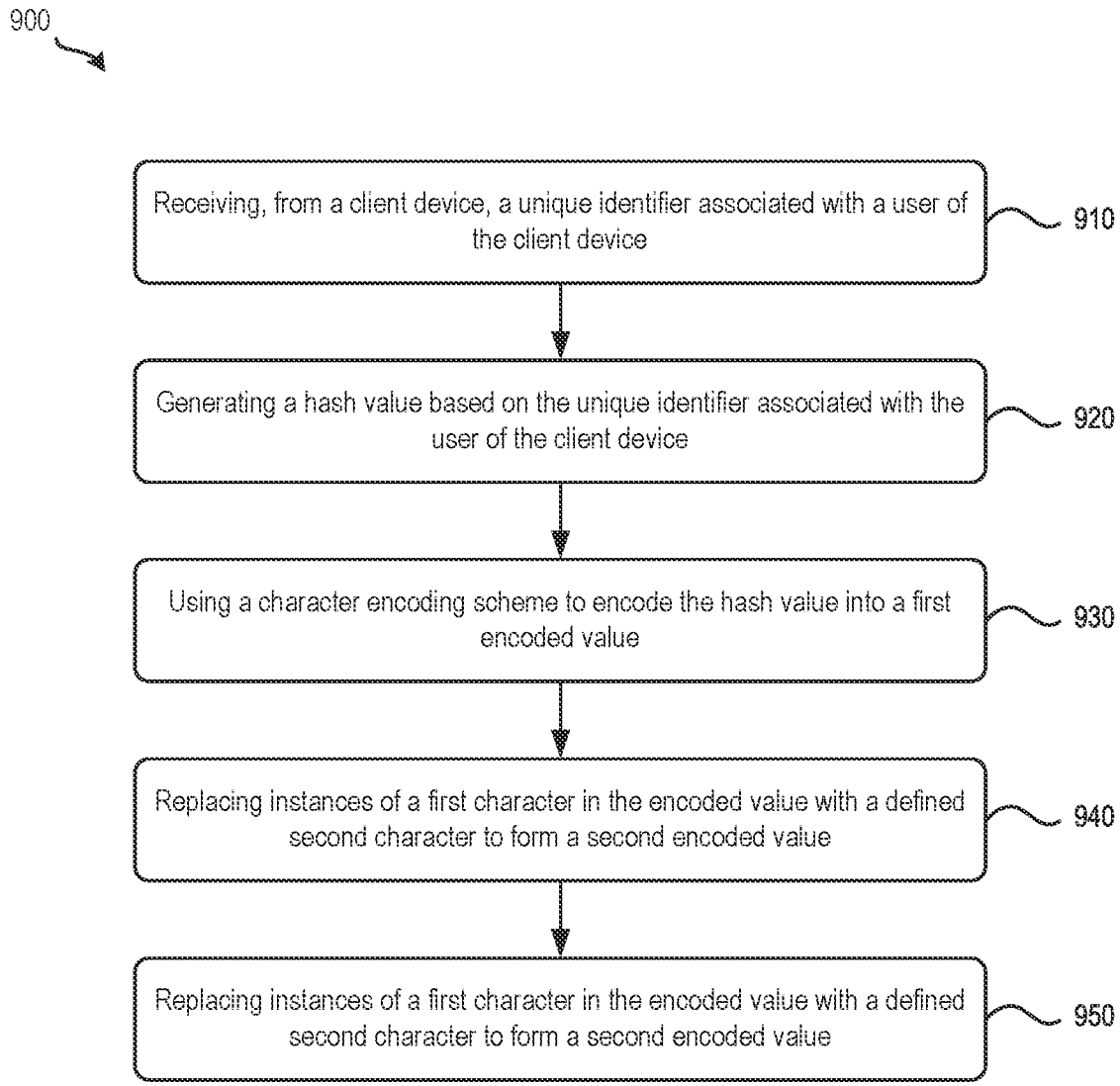
FIG. 9 illustrates a process for generating names for cloud storage containers according to some embodiments.

FIG. 9 illustrates process 900 for generating names for cloud storage containers according to some embodiments. In some embodiments, computing system 110 performs process 900 when computing system 110 determines a name of a storage container associated with a user (e.g., in response to the user logging into application 115 for the first time, in response to the user requesting to add data to the data being managed by application 115 for the user, in response to the user requesting modification to data being managed by application 115 for the user, in response to the user requesting to access data being managed by application 115 for the user, etc.). Process 900 begins at 910 by receiving from a client device, a unique identifier associated with a user of the client device. Referring to FIGS. 2 and 3 as an example, application 115 may receive from client device 105 user ID 300 associated with a user when the user uses client device 105 to login to application 115.

Next, process 900 generates, at 920, a hash value based on the unique identifier associated with the user of the client device. Referring to FIGS. 2-4 as an example, hashing engine 120 can use user ID 300 as an input to a hash function to generate hash value 400 similar to the example operation described above by reference to FIGS. 2-6.

Then, process 900 uses, at 930, a character encoding scheme to encode the hash value into a first encoded value. Referring to FIGS. 2, 4 and 5 as an example, encoding manager 125 may encode hash value 400 to form encoded value 500 using the same technique as the example operation described above by reference to FIGS. 2-6.

At 940, process 900 replaces instances of a first character in the encoded value with a defined second character to form a second encoded value. Referring to FIGS. 2, 5, and 6 as an example, encoding manager 125 can retrieve replacement rules (e.g., one of the replacement rules mentioned above in the example operation described by reference to FIGS. 2-6) from replacement rules storage 130. As explained above, a replacement rule may specify two character strings where the second character string defines the string that is used to replace instances of the first character string. Encoding manager 125 can apply a retrieved replacement rule on encoded value 500 to replace instances of the first string specified in the replacement with the second string specified in the replacement rule. After encoding manager 125 applies the replacement rules on encoded value 500, encoded value 600 is formed.

Finally, process 900 sends, at 950, the second encoded value to a cloud storage service for the cloud storage service to create a storage container using the second encoded value as a name of the storage container. Referring to FIGS. 2 and 6 as an example, encoding manager 125 may send cloud storage service 135 encoded value 600 (i.e., the second encoded value) as well as a request to create a storage container with encoded value 600 as its name In response, cloud storage service 135 creates a storage container that has encoded value 600 as its name.

Figure 10:
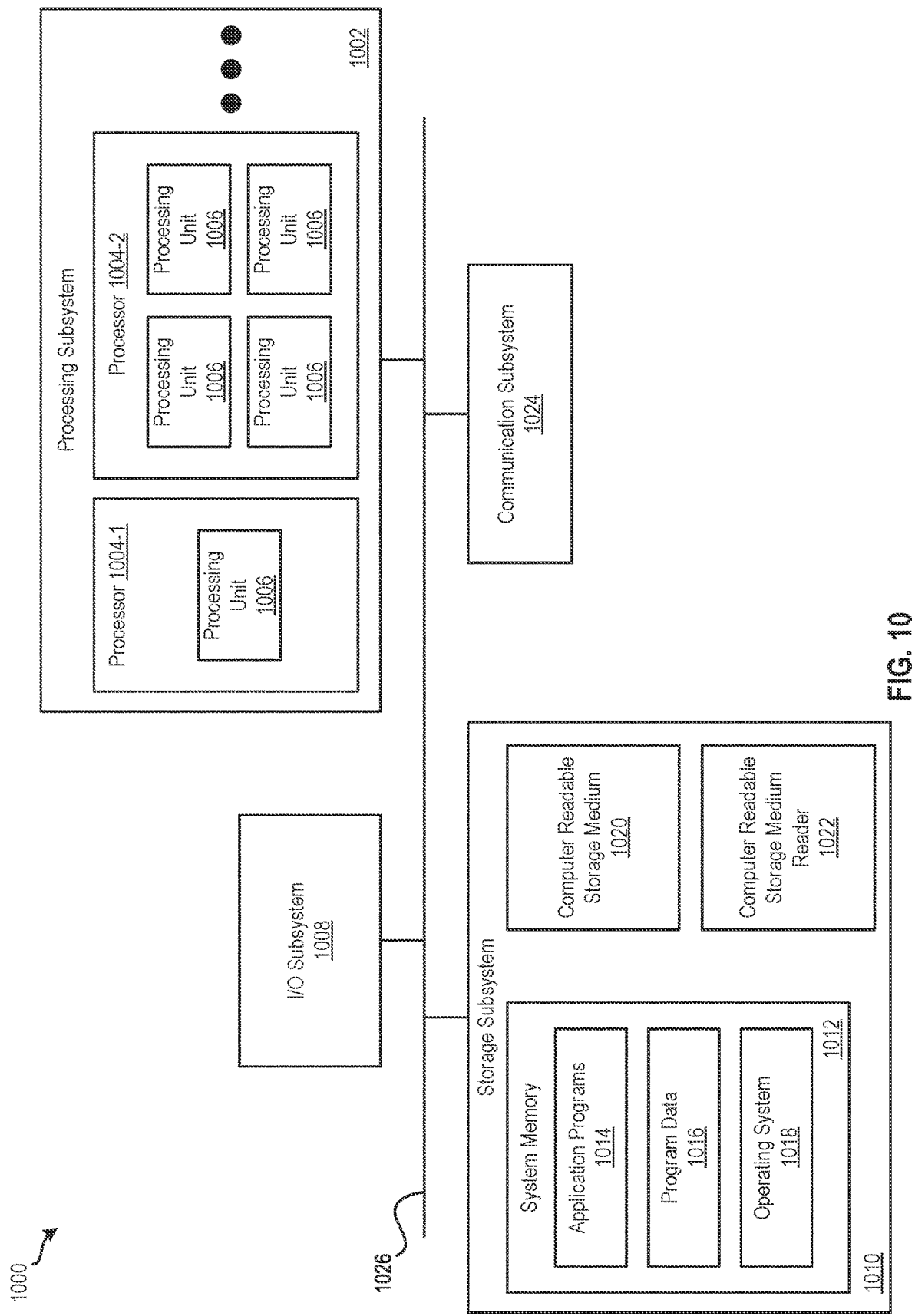
FIG. 10 illustrates an exemplary computer system, in which various embodiments may be implemented.

FIG. 10 illustrates an exemplary computer system 1000 for implementing various embodiments described above. For example, computer system 1000 may be used to implement client device 105, computing system 110, cloud storage services 135. Computer system 1000 may be a desktop computer, a laptop, a server computer, or any other type of computer system or combination thereof. Some or all elements of application 115, hashing engine 120, encoding manager 125, or combinations thereof can be included or implemented in computer system 1000. In addition, computer system 1000 can implement many of the operations, methods, and/or processes described above (e.g., process 900). As shown in FIG. 10, computer system 1000 includes processing subsystem 1002, which communicates, via bus subsystem 1026, with input/output (I/O) subsystem 1008, storage subsystem 1010 and communication subsystem 1024.

Bus subsystem 1026 is configured to facilitate communication among the various components and subsystems of computer system 1000. While bus subsystem 1026 is illustrated in FIG. 10 as a single bus, one of ordinary skill in the art will understand that bus subsystem 1026 may be implemented as multiple buses. Bus subsystem 1026 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1002, which can be implemented as one or more integrated circuits (e.g., a conventional microprocessor or microcontroller), controls the operation of computer system 1000. Processing subsystem 1002 may include one or more processors 1004. Each processor 1004 may include one processing unit 1006 (e.g., a single core processor such as processor 1004-1) or several processing units 1006 (e.g., a multicore processor such as processor 1004-2). In some embodiments, processors 1004 of processing subsystem 1002 may be implemented as independent processors while, in other embodiments, processors 1004 of processing subsystem 1002 may be implemented as multiple processors integrate into a single chip or multiple chips. Still, in some embodiments, processors 1004 of processing subsystem 1002 may be implemented as a combination of independent processors and multiple processors integrated into a single chip or multiple chips.

In some embodiments, processing subsystem 1002 can execute a variety of programs or processes in response to program code and can maintain multiple concurrently executing programs or processes. At any given time, some or all of the program code to be executed can reside in processing subsystem 1002 and/or in storage subsystem 1010. Through suitable programming, processing subsystem 1002 can provide various functionalities, such as the functionalities described above by reference to process 900.

I/O subsystem 1008 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1000 to a user or another device (e.g., a printer).

As illustrated in FIG. 10, storage subsystem 1010 includes system memory 1012, computer-readable storage medium 1020, and computer-readable storage medium reader 1022. System memory 1012 may be configured to store software in the form of program instructions that are loadable and executable by processing subsystem 1002 as well as data generated during the execution of program instructions. In some embodiments, system memory 1012 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1012 may include different types of memory, such as static random access memory (SRAM) and/or dynamic random access memory (DRAM). System memory 1012 may include a basic input/output system (BIOS), in some embodiments, that is configured to store basic routines to facilitate transferring information between elements within computer system 1000 (e.g., during start-up). Such a BIOS may be stored in ROM (e.g., a ROM chip), flash memory, or any other type of memory that may be configured to store the BIOS.

As shown in FIG. 10, system memory 1012 includes application programs 1014 (e.g., application 115), program data 1016, and operating system (OS) 1018. OS 1018 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1020 may be a non-transitory computer-readable medium configured to store software (e.g., programs, code modules, data constructs, instructions, etc.). Many of the components (e.g., application 115, hashing engine 120, and encoding manager 125) and/or processes (e.g., process 900) described above may be implemented as software that when executed by a processor or processing unit (e.g., a processor or processing unit of processing subsystem 1002) performs the operations of such components and/or processes. Storage subsystem 1010 may also store data used for, or generated during, the execution of the software.

Storage subsystem 1010 may also include computer-readable storage medium reader 1022 that is configured to communicate with computer-readable storage medium 1020. Together and, optionally, in combination with system memory 1012, computer-readable storage medium 1020 may comprehensively represent remote, local, fixed, and/or removable storage devices plus storage media for temporarily and/or more permanently containing, storing, transmitting, and retrieving computer-readable information.

Computer-readable storage medium 1020 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1024 serves as an interface for receiving data from, and transmitting data to, other devices, computer systems, and networks. For example, communication subsystem 1024 may allow computer system 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1024 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1024 may provide components configured for wired communication (e.g., Ethernet) in addition to or instead of components configured for wireless communication.

One of ordinary skill in the art will realize that the architecture shown in FIG. 10 is only an example architecture of computer system 1000, and that computer system 1000 may have additional or fewer components than shown, or a different configuration of components. The various components shown in FIG. 10 may be implemented in hardware, software, firmware or any combination thereof, including one or more signal processing and/or application specific integrated circuits.

Figure 11:
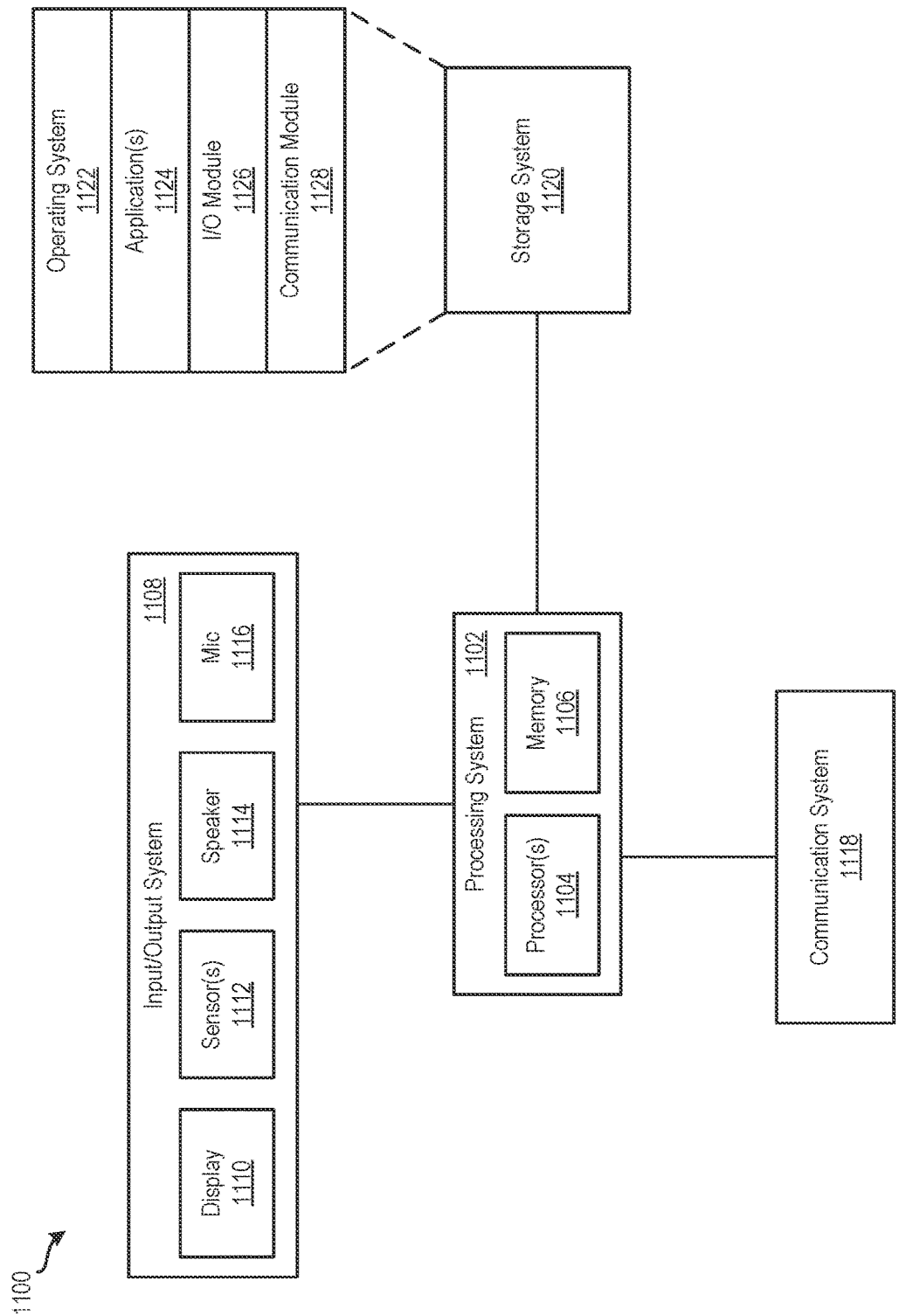
FIG. 11 illustrates an exemplary computing device, in which various embodiments may be implemented.

FIG. 11 illustrates an exemplary computing device 1100 for implementing various embodiments described above. For example, computing device 1100 may be used to implement client device 105. Computing device 1100 may be a cellphone, a smartphone, a wearable device, an activity tracker or manager, a tablet, a personal digital assistant (PDA), a media player, or any other type of mobile computing device or combination thereof. As shown in FIG. 11, computing device 1100 includes processing system 1102, input/output (I/O) system 1108, communication system 1118, and storage system 1120. These components may be coupled by one or more communication buses or signal lines.

Processing system 1102, which can be implemented as one or more integrated circuits (e.g., a conventional microprocessor or microcontroller), controls the operation of computing device 1100. As shown, processing system 1102 includes one or more processors 1104 and memory 1106. Processors 1104 are configured to run or execute various software and/or sets of instructions stored in memory 1106 to perform various functions for computing device 1100 and to process data.

Each processor of processors 1104 may include one processing unit (e.g., a single core processor) or several processing units (e.g., a multicore processor). In some embodiments, processors 1104 of processing system 1102 may be implemented as independent processors while, in other embodiments, processors 1104 of processing system 1102 may be implemented as multiple processors integrate into a single chip. Still, in some embodiments, processors 1104 of processing system 1102 may be implemented as a combination of independent processors and multiple processors integrated into a single chip.

Memory 1106 may be configured to receive and store software (e.g., operating system 1122, applications 1124, I/O module 1126, communication module 1128, etc. from storage system 1120) in the form of program instructions that are loadable and executable by processors 1104 as well as data generated during the execution of program instructions. In some embodiments, memory 1106 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1108 is responsible for receiving input through various components and providing output through various components. As shown for this example, I/O system 1108 includes display 1110, one or more sensors 1112, speaker 1114, and microphone 1116. Display 1110 is configured to output visual information (e.g., a graphical user interface (GUI) generated and/or rendered by processors 1104). In some embodiments, display 1110 is a touch screen that is configured to also receive touch-based input. Display 1110 may be implemented using liquid crystal display (LCD) technology, light-emitting diode (LED) technology, organic LED (OLED) technology, organic electro luminescence (OEL) technology, or any other type of display technologies. Sensors 1112 may include any number of different types of sensors for measuring a physical quantity (e.g., temperature, force, pressure, acceleration, orientation, light, radiation, etc.). Speaker 1114 is configured to output audio information and microphone 1116 is configured to receive audio input. One of ordinary skill in the art will appreciate that I/O system 1108 may include any number of additional, fewer, and/or different components. For instance, I/O system 1108 may include a keypad or keyboard for receiving input, a port for transmitting data, receiving data and/or power, and/or communicating with another device or component, an image capture component for capturing photos and/or videos, etc.

Communication system 1118 serves as an interface for receiving data from, and transmitting data to, other devices, computer systems, and networks. For example, communication system 1118 may allow computing device 1100 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1118 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1118 may provide components configured for wired communication (e.g., Ethernet) in addition to or instead of components configured for wireless communication.

Storage system 1120 handles the storage and management of data for computing device 1100. Storage system 1120 may be implemented by one or more non-transitory machine-readable mediums that are configured to store software (e.g., programs, code modules, data constructs, instructions, etc.) and store data used for, or generated during, the execution of the software.

In this example, storage system 1120 includes operating system 1122, one or more applications 1124, I/O module 1126, and communication module 1128. Operating system 1122 includes various procedures, sets of instructions, software components and/or drivers for controlling and managing general system tasks (e.g., memory management, storage device control, power management, etc.) and facilitates communication between various hardware and software components. Operating system 1122 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1124 can include any number of different applications installed on computing device 1100. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1126 manages information received via input components (e.g., display 1110, sensors 1112, and microphone 1116) and information to be outputted via output components (e.g., display 1110 and speaker 1114). Communication module 1128 facilitates communication with other devices via communication system 1118 and includes various software components for handling data received from communication system 1118.

One of ordinary skill in the art will realize that the architecture shown in FIG. 11 is only an example architecture of computing device 1100, and that computing device 1100 may have additional or fewer components than shown, or a different configuration of components. The various components shown in FIG. 11 may be implemented in hardware, software, firmware or any combination thereof, including one or more signal processing and/or application specific integrated circuits.

Figure 12:
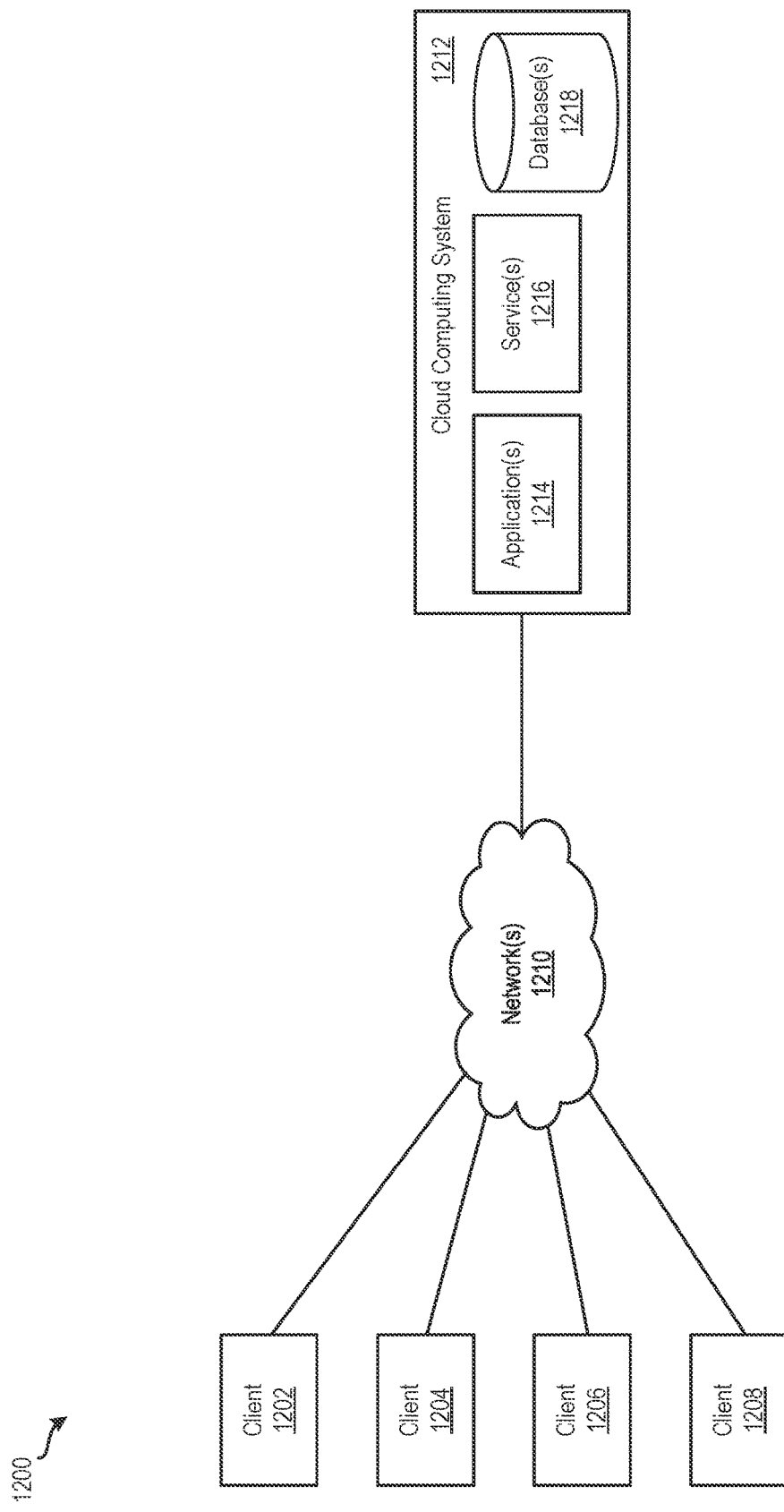
FIG. 12 illustrates an exemplary system, in which various embodiments may be implemented.

FIG. 12 illustrates an exemplary system 1200 for implementing various embodiments described above. For example, cloud computing system 1212 may be used to implement computing system 110 and cloud storage service 135. As shown, system 1200 includes client devices 1202-1208, one or more networks 1210, and cloud computing system 1212. Cloud computing system 1212 is configured to provide resources and data to client devices 1202-1208 via networks 1210. In some embodiments, cloud computing system 1200 provides resources to any number of different users (e.g., customers, tenants, organizations, etc.). Cloud computing system 1212 may be implemented by one or more computer systems (e.g., servers), virtual machines operating on a computer system, or a combination thereof.

As shown, cloud computing system 1212 includes one or more applications 1214, one or more services 1216, and one or more databases 1218. Cloud computing system 1200 may provide applications 1214, services 1216, and databases 1218 to any number of different customers in a self-service, subscription-based, elastically scalable, reliable, highly available, and secure manner.

In some embodiments, cloud computing system 1200 may be adapted to automatically provision, manage, and track a customer's subscriptions to services offered by cloud computing system 1200. Cloud computing system 1200 may provide cloud services via different deployment models. For example, cloud services may be provided under a public cloud model in which cloud computing system 1200 is owned by an organization selling cloud services and the cloud services are made available to the general public or different industry enterprises. As another example, cloud services may be provided under a private cloud model in which cloud computing system 1200 is operated solely for a single organization and may provide cloud services for one or more entities within the organization. The cloud services may also be provided under a community cloud model in which cloud computing system 1200 and the cloud services provided by cloud computing system 1200 are shared by several organizations in a related community. The cloud services may also be provided under a hybrid cloud model, which is a combination of two or more of the aforementioned different models.

In some instances, any one of applications 1214, services 1216, and databases 1218 made available to client devices 1202-1208 via networks 1210 from cloud computing system 1212 is referred to as a "cloud service." Typically, servers and systems that make up cloud computing system 1212 are different from the on-premises servers and systems of a customer. For example, cloud computing system 1212 may host an application and a user of one of client devices 1202-1208 may order and use the application via networks 1210.

Applications 1214 may include software applications that are configured to execute on cloud computing system 1212 (e.g., a computer system or a virtual machine operating on a computer system) and be accessed, controlled, managed, etc. via client devices 1202-1208. In some embodiments, applications 1214 may include server applications and/or mid-tier applications (e.g., HTTP (hypertext transport protocol) server applications, FTP (file transfer protocol) server applications, CGI (common gateway interface) server applications, JAVA server applications, etc.). Services 1216 are software components, modules, application, etc. that are configured to execute on cloud computing system 1212 and provide functionalities to client devices 1202-1208 via networks 1210. Services 1216 may be web-based services or on-demand cloud services.

Databases 1218 are configured to store and/or manage data that is accessed by applications 1214, services 1216, and/or client devices 1202-1208. For instance, replacement rules storage 130 and storage containers 140a-n may be stored in databases 1218. Databases 1218 may reside on a non-transitory storage medium local to (and/or resident in) cloud computing system 1212, in a storage-area network (SAN), on a non-transitory storage medium local located remotely from cloud computing system 1212. In some embodiments, databases 1218 may include relational databases that are managed by a relational database management system (RDBMS). Databases 1218 may be a column-oriented databases, row-oriented databases, or a combination thereof. In some embodiments, some or all of databases 1218 are in-memory databases. That is, in some such embodiments, data for databases 1218 are stored and managed in memory (e.g., random access memory (RAM)).

Client devices 1202-1208 are configured to execute and operate a client application (e.g., a web browser, a proprietary client application, etc.) that communicates with applications 1214, services 1216, and/or databases 1218 via networks 1210. This way, client devices 1202-1208 may access the various functionalities provided by applications 1214, services 1216, and databases 1218 while applications 1214, services 1216, and databases 1218 are operating (e.g., hosted) on cloud computing system 1200. Client devices 1202-1208 may be computer system 1000 or computing device 1100, as described above by reference to FIGS. 10 and 11, respectively. Although system 1200 is shown with four client devices, any number of client devices may be supported.

Networks 1210 may be any type of network configured to facilitate data communications among client devices 1202-1208 and cloud computing system 1212 using any of a variety of network protocols. Networks 1210 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
   receiving, from a client device, a unique identifier associated with a user of the client device;
   generating a hash value based on the unique identifier associated with the user of the client device;
   using a character encoding scheme to encode the hash value into a first encoded value;
   replacing instances of a first character in the encoded value with a defined second character to form a second encoded value; and
   sending the second encoded value to a cloud storage service for the cloud storage service to create a storage container using the second encoded value as a name of the storage container.

2. The non-transitory machine-readable medium of claim 1, wherein the hash value is a first hash value, wherein the program further comprises set of instructions for:
   receiving, from the client device, a request associated with the storage container and the unique identifier associated with the user of the client device;
   generating a second hash value based on the unique identifier associated with the user of the client device;
   using the character encoding scheme to encode the second hash value into a third encoded value; and
   replacing instances of the first character in the third encoded value with the defined second character to form a fourth encoded value.

3. The non-transitory machine-readable medium of claim 2, wherein the request associated with the storage container is a request to add an object to the storage container.

4. The non-transitory machine-readable medium of claim 1, wherein using the character encoding scheme to encode the hash value comprises iteratively identifying a defined number of bits in the hash value and encoding the defined number of bits into a character based on the character encoding scheme.

5. The non-transitory machine-readable medium of claim 1, wherein the character encoding scheme is configured to encode values into characters belonging to a defined set of characters, wherein the defined second character is not in the defined set of characters.

6. The non-transitory machine-readable medium of claim 1, wherein the character encoding scheme is configured to encode hash values into single case characters, wherein single case characters are lowercase or uppercase characters.

7. The non-transitory machine-readable medium of claim 1, wherein replacing instances of the first character in the encoded value with the defined second character to form the second encoded value comprises retrieving a replacement rule that specifies the first character and the second character.

8. A method comprising:
   receiving, from a client device, a unique identifier associated with a user of the client device;
   generating a hash value based on the unique identifier associated with the user of the client device;
   using a character encoding scheme to encode the hash value into a first encoded value;
   replacing instances of a first character in the encoded value with a defined second character to form a second encoded value; and
   sending the second encoded value to a cloud storage service for the cloud storage service to create a storage container using the second encoded value as a name of the storage container.

9. The method of claim 8, wherein the hash value is a first hash value, the method further comprising:
   receiving, from the client device, a request associated with the storage container and the unique identifier associated with the user of the client device;
   generating a second hash value based on the unique identifier associated with the user of the client device;
   using the character encoding scheme to encode the second hash value into a third encoded value; and
   replacing instances of the first character in the third encoded value with the defined second character to form a fourth encoded value.

10. The method of claim 9, wherein the request associated with the storage container is a request to add an object to the storage container.

11. The method of claim 8, wherein using the character encoding scheme to encode the hash value comprises iteratively identifying a defined number of bits in the hash value and encoding the defined number of bits into a character based on the character encoding scheme.

12. The method of claim 8, wherein the character encoding scheme is configured to encode values into characters belonging to a defined set of characters, wherein the defined second character is not in the defined set of characters.

13. The method of claim 8, wherein the character encoding scheme is configured to encode hash values into single case characters, wherein single case characters are lowercase or uppercase characters.

14. The method of claim 8, wherein replacing instances of the first character in the encoded value with the defined second character to form the second encoded value comprises retrieving a replacement rule that specifies the first character and the second character.

15. A system comprising:
   a set of processing units; and
   a non-transitory machine-readable medium storing instructions that when executed by at least one processing unit in the set of processing units cause the at least one processing unit to:
   receive, from a client device, a unique identifier associated with a user of the client device;
   generate a hash value based on the unique identifier associated with the user of the client device;

use a character encoding scheme to encode the hash value into a first encoded value;

replace instances of a first character in the encoded value with a defined second character to form a second encoded value; and send the second encoded value to a cloud storage service for the cloud storage service to create a storage container using the second encoded value as a name of the storage container.

16. The system of claim 15, wherein the hash value is a first hash value, wherein the instructions further cause the at least one processing unit to:

receive, from the client device, a request associated with the storage container and the unique identifier associated with the user of the client device;

generate a second hash value based on the unique identifier associated with the user of the client device;

use the character encoding scheme to encode the second hash value into a third encoded value; and replace instances of the first character in the third encoded value with the defined second character to form a fourth encoded value.

17. The system of claim 16, wherein the request associated with the storage container is a request to add an object to the storage container.

18. The system of claim 15, wherein using the character encoding scheme to encode the hash value comprises iteratively identifying a defined number of bits in the hash value and encoding the defined number of bits into a character based on the character encoding scheme.

19. The system of claim 15, wherein the character encoding scheme is configured to encode values into characters belonging to a defined set of characters, wherein the defined second character is not in the defined set of characters.

20. The system of claim 15, wherein the character encoding scheme is configured to encode hash values into single case characters, wherein single case characters are lowercase or uppercase characters.

* * * * *